United States Patent
Voigtlaender et al.

(10) Patent No.: US 6,438,466 B1
(45) Date of Patent: Aug. 20, 2002

(54) DEVICE FOR DETERMINING DISTANCE AND FOR TRANSMITTING DATA IN A MOTOR VEHICLE

(75) Inventors: Klaus Voigtlaender, Wangen; Wolfgang Kramp, Ditzengen; Stefan Gaier, Stuttgart; Elmar Giehler, Markgroeningen; Jürgen Hasch, Uhlingen; Stephan Schmitz; Lothar Groesch, both of Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/889,863

(22) PCT Filed: Jan. 19, 2000

(86) PCT No.: PCT/DE00/00161
§ 371 (c)(1),
(2), (4) Date: Dec. 19, 2001

(87) PCT Pub. No.: WO00/43970
PCT Pub. Date: Jul. 27, 2000

(30) Foreign Application Priority Data

Jan. 21, 1999 (DE) .......................................... 199 02 185

(51) Int. Cl.$^7$ ............................................ G08G 1/0967
(52) U.S. Cl. .............................. 701/1; 340/46; 340/47; 340/48

(58) Field of Search ................................. 701/1; 340/46, 340/47, 48; 342/457

(56) References Cited

U.S. PATENT DOCUMENTS

| | | | |
|---|---|---|---|
| 5,594,447 A | 1/1997 | Fujisaka et al. ............... 342/42 |
| 5,680,137 A | * 10/1997 | Ando et al. .................. 342/127 |
| 5,748,141 A | * 5/1998 | Hoess .......................... 342/109 |
| 5,917,430 A | * 6/1999 | Greneker et al. ........... 340/905 |

FOREIGN PATENT DOCUMENTS

| | | |
|---|---|---|
| DE | 44 42 189 | 5/1996 |
| DE | 197 32 044 | 2/1999 |
| WO | WO 97 08565 | 3/1997 |

* cited by examiner

*Primary Examiner*—William A. Cuchlinski, Jr.
*Assistant Examiner*—Marthe Y. Marc-Coleman
(74) *Attorney, Agent, or Firm*—Kenyon & Kenyon

(57) ABSTRACT

A device is proposed for ascertaining distance and transmitting data in a motor vehicle. It has a transmitting arrangement for generating and emitting a radar signal. A receiving arrangement receives a radar signal. It is characterized in that switchover arrangements are provided which cause the transmitting and/or receiving arrangement to operate either in a radar operating mode for detecting the distance and/or speed of a further object, or in a data-exchange operating mode for the exchange of data with a transceiver. Specific functions are enabled in dependence on the data exchange.

12 Claims, 4 Drawing Sheets

DEVICE FOR DETERMINING DISTANCE AND FOR TRANSMITTING DATA IN A MOTOR VEHICLE

FIELD OF THE INVENTION

The present invention relates to a device for ascertaining distance and transmitting data in a motor vehicle.

BACKGROUND INFORMATION

A system for measuring distance and the selective transmission of information for motor-vehicle applications is described in German Published Patent Application No. 44 42 189. The transmitting and receiving units provided for the distance measurement are at the same time used for transmitting and receiving information and/or the signals used for the distance measurement are utilized directly for the transfer of information. With the aid of the distance measurement, passive protective measures for vehicles can be activated in response to a front, side or rear collision. The information exchange is used for assessing traffic situations, or for detection, identification and cost allocation for a road toll.

SUMMARY OF THE INVENTION

An object of the present invention is to develop the transmission channel, present for the distance measurement, for further motor-vehicle functions which are only activated in conjunction with a data exchange deemed as valid.

The device for ascertaining distance and transmitting data in a motor vehicle has a transmission arrangement for generating and emitting a radar signal. It is equipped with a receiving arrangement for the reception of a radar signal for detecting the distance and/or the speed of a further object. The device of the present invention has the distinction that a switchover arrangement are provided which cause the transmitting and/or receiving arrangement to operate either in a radar operating mode for determining distance and/or speed of the further object, or in a data-exchange operating mode for the data exchange with a transceiver, specific motor-vehicle functions being enabled as a function of the data exchange. These motor-vehicle functions can be a master-key system or the cancellation of a vehicle immobilizer. According to the present invention, the transmitting and receiving arrangement, present anyway for ascertaining the distance or speed, are also used for the purpose of exchanging data with an optionally portable transceiver. The data exchange with the transceiver is evaluated for an authorization. If the receiving arrangement receives a data signal, recognized as valid, from the transceiver, then, for example, the master-key system is activated along the lines of unlocking. If the data exchange proceeds within the motor vehicle, then it can be utilized to query the driving authorization of the user with the aid of the transceiver carried along. The start enablement is only granted in response to a transceiver signal recognized as authorized. By integrating the additional function of the data exchange for the purpose of the access authorization and start authorization, existing components which are already provided for implementing other functions can likewise be utilized. With the aid of the switchover arrangement, the different operating modes of the transmitting and receiving arrangement can be specifically selected depending on the operating situation. In the radar operating mode, the distance and/or the speed of the vehicle with respect to an adjacent object is/are ascertained. These data can be utilized for triggering an airbag, for controlling a warning device in connection with a Park Pilot system, detection of objects in the so-called dead angle, and stop-and-go detection. An emission of the radar signal into the passenger compartment of the motor vehicle can be evaluated for the purpose of monitoring the passenger compartment in conjunction with a car alarm or a seat-occupant detection.

In one expedient refinement, the data-exchange operating mode is activated when the motor vehicle has been switched off and/or the user has left the motor vehicle. At this point, the transmitting and receiving arrangement are controlled, such that they are able to send and/or receive and evaluate a data signal. Namely, to unlock the master-key system, an appropriate data signal is expected from the transceiver.

In another refinement, the data-exchange operating mode is activated when a switching element has been actuated, for example, in conjunction with the initiation of an unlocking operation and/or start of the motor vehicle. For instance, upon actuation of the ignition switch, a switchover is made to the data-exchange operating mode. In order for the enablement to be granted for starting the motor vehicle, it is necessary for the transmitting and receiving arrangement and the transceiver to have run through a data exchange recognized as valid. If the data exchange is to be evaluated for the purpose of unlocking the motor vehicle, the user, for example, actuates the door handle of the motor vehicle. The switching signal recognized in this connection brings about a switchover into the data-exchange operating mode, so that data can now be exchanged with the transceiver. If the data exchange is run through successfully, the master-key system is activated along the lines of unlocking.

In one advantageous refinement, the switchover arrangement is controlled in the manner that they are used for information coding. Thus, a dual function is ensured. First of all, the switchover can consequently be implemented; on the other hand, in the data-exchange operating mode, the switchover arrangement are used as a modulation arrangement.

DETAILED DESCRIPTION

Figure 1:
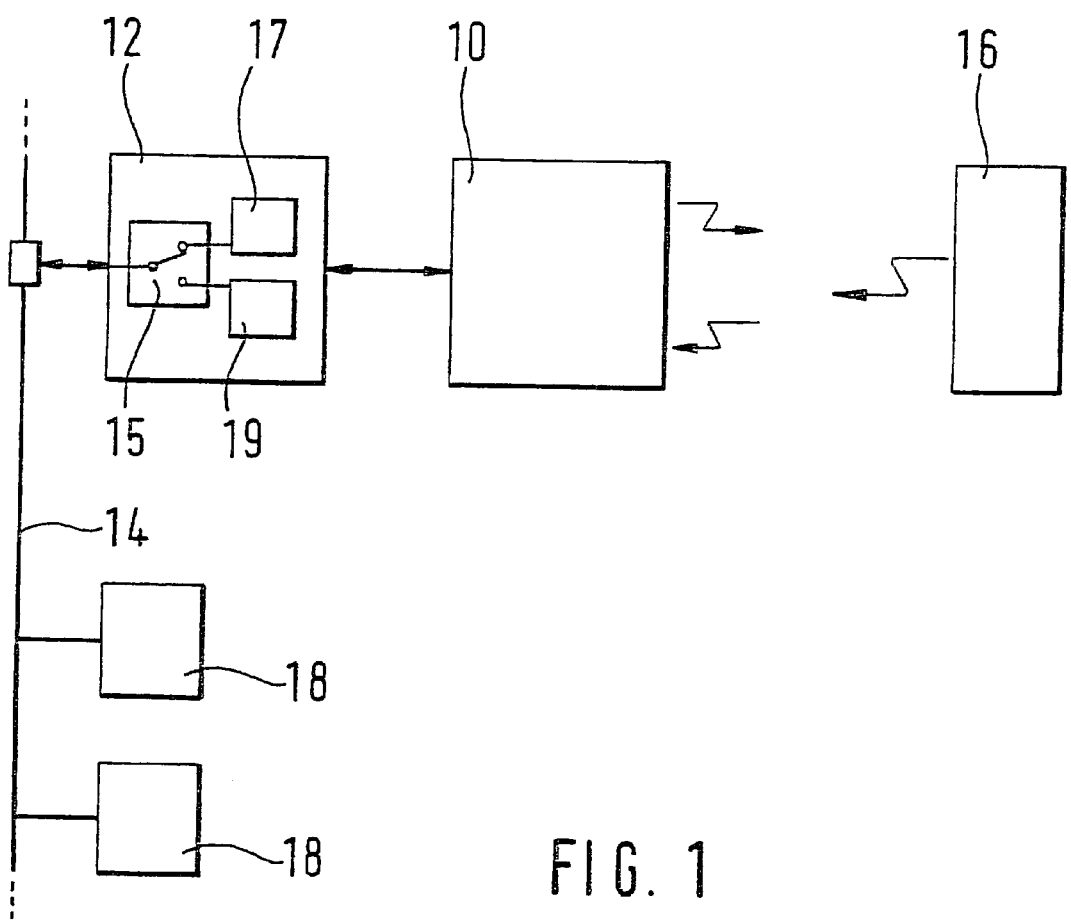
FIG. 1 shows a block diagram.

A transmitting/receiving device 10 emits a radar signal and receives a radar signal. Transmitting/receiving device 10 is able to exchange a data signal with a transceiver 16. Transmitting/receiving device 10 exchanges signals with a control unit 12. Indicated schematically, a radar operating mode 17 and a data-exchange operating mode 19 are implemented in control unit 12. Either radar operating mode 17 or data-exchange operating mode 19 can be activated via a switchover arrangement 15. Control unit 12 exchanges data with further function control units 18 by way of a bus system 14.

Figure 2:
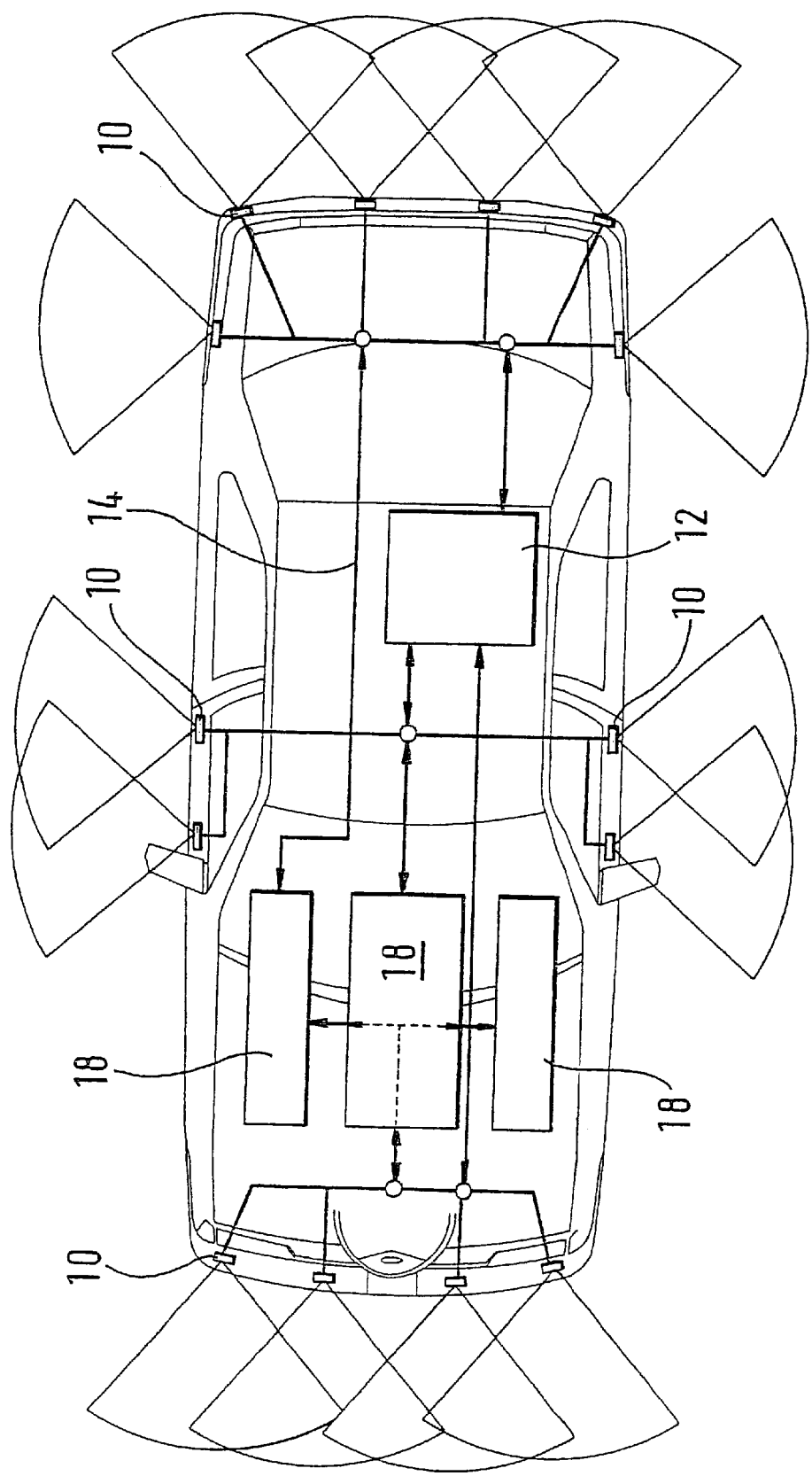
FIG. 2 shows a first view of one possible arrangement and networking in the motor vehicle.

According to the exemplary embodiment as shown in FIG. 2, transmitting/receiving devices which take in the external space of the motor vehicle are arranged around it.

Transmitting/receiving devices 10, preferably located at the front and rear, as well as in the side-door area, are networked via bus system 14 and are connected to control unit 12 and function control unit 18.

Figure 3:
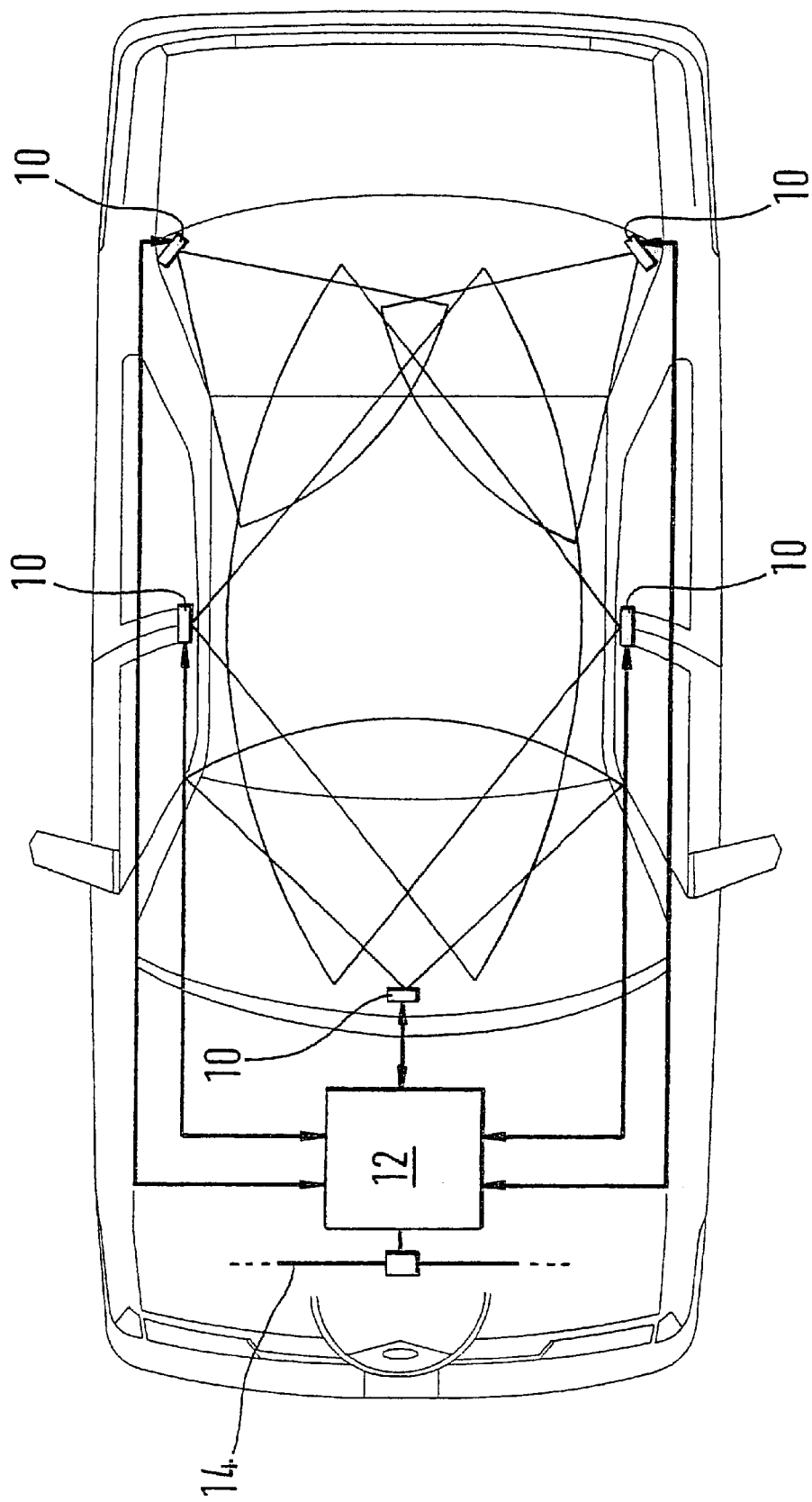
FIG. 3 shows a second view of the one arrangement and networking in the vehicle.

In the exemplary embodiment according to FIG. 3, at least one transmitting/receiving device 10 is arranged in the passenger compartment, e.g. at the inner door post, and is aligned such that signals can be emitted into and received from the passenger compartment. Transmitting/receiving devices 10 exchange signals with control unit 12, which is optionally coupled to further function control units 18 via bus system 14.

A clock-pulse generator 24 emits its output signal to a first pulse generator 26 and to a time delay 28. The output signal of time delay 28 is fed to a second pulse generator 27. The output signal of first pulse generator 26 is the input variable of a first switchover arrangement 21 which is controlled as a function of an output signal of control unit 12. The output signal of first switching element 21 is used as a controlled variable for a first switching element 31. An oscillator 34, optionally likewise influenced by control unit 12, emits its output signal via a power divider 36 and first switching element 31 to a transmitting antenna 40. The output signal of adjustable time delay 28 is used as input variable for a second pulse generator 27 whose output signal is fed to a second switchover arrangement 22 that is likewise controlled by control unit 12. The output signal of second switchover arrangement 22 is used as controlled variable for a second switching element 32. The second output signal of power divider 36 is supplied via second switching element 32 to a mixer 38. A signal received by a receiving antenna 42 forms the second input variable of the mixer. Mixer 38 emits an output signal 44.

Figure 4:
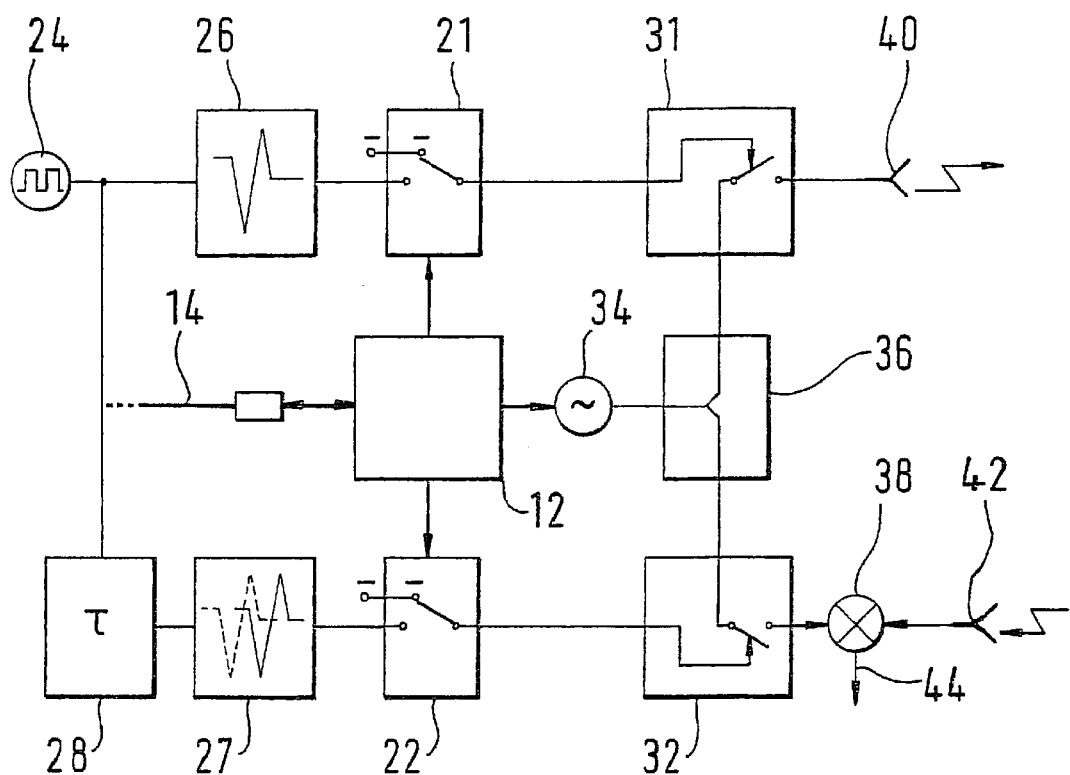
FIG. 4 shows a first schematic, circuit-engineering implementation of the device according to the present invention.
Figure 5:
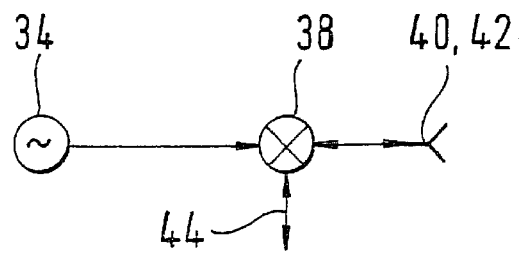
FIG. 5 shows a second schematic, circuit-engineering implementation of the device according to the present invention.

The exemplary embodiment according to FIG. 5 is a very simplified specific embodiment compared to FIG. 4. The output signal of oscillator 34 is supplied directly to mixer 38. The second input/output of mixer 38 is connected to transmitting antenna 40 and receiving antenna 42, respectively. Depending on the control, mixer 38 is fed a further input signal, or is tapped as mixer output signal.

Radar operating mode 17 and data-exchange operating mode 19 are stored in control unit 12. Radar operating mode 17 is used for ascertaining the distance and speed, respectively, of the motor vehicle in relation to further objects. To that end, a short radar pulse is emitted, and the reflection wave subsequently coming in again is evaluated with regard to the propagation time difference. The distance to objects and their relative speed can be determined on the basis of the propagation time difference. If a plurality of measurements are carried out, the speed is determined through differentiation of the distance. In the case of only one measurement, the speed can be derived with the aid of the Doppler effect.

Switchover arrangement 15 makes a selection between radar operating mode 17 and data-exchange operating mode 19. In the data-exchange operating mode, transmitting/receiving device 10, through an appropriate coding, frequency modulation or phase modulation, is able to transmit and receive data signals. Data are exchanged with transceiver 16. Within the framework of an authorization query, the data signal sent by transceiver 16 is received and evaluated as to whether it agrees with a reference signal deemed as valid. Motor-vehicle functions are activated, i.e. enabled as a function of this legitimacy check of the signal received in data-exchange operating mode 19. A signal recognized as valid causes the master-key system to lock or unlock. Within a driving authorization query, this authorization is only granted when a transceiver 16, recognized as valid on the basis of the data exchange, was present in the passenger compartment of the motor vehicle. In data-exchange operating mode 19, the energy necessary for carrying out the transmission process can also be provided to transceiver 16, so that it does not have to have its own energy supply.

In the exemplary embodiment according to FIG. 2, transmitting/receiving devices 10 are arranged in such a way that they take in the external space of the motor vehicle. In radar operating mode 17, the reflected radar signals at low speeds, —e.g. less than 30 km/h—are evaluated for a Park Pilot system. If a specific distance to an adjacent object is exceeded, a warning signal is generated which signals a collision danger to the user. In this operating mode, the distance is detected. In "stop-and-go" operation, radar operating mode 17 can likewise be used in the case of a traffic jam to signal to the driver the stopping or continuation of driving by the person in front, or to cause this automatically. As a further application case, with the aid of radar operating mode 17, the airbag can be triggered when the vehicle is stationary for protection against striking vehicles.

At higher speeds—e.g. greater than 30 km/h—the reflected radar signal is evaluated for early crash detection. For example, airbag triggering can be initiated if an imminent crash is detected based on these signals.

The switchover from radar operating mode 17 to data-exchange operating mode 19 is preferably made when the vehicle is at a standstill, in order to unlock a locked vehicle with the aid of transceiver 16. The operating-mode switchover can be triggered by various events. First of all, transmitting/receiving device 10 can be switched periodically to receive mode. Alternatively, data-exchange operating mode 19 is activated by pulling on the door handle with the actuation of the appropriate switching contact.

Transmitting/receiving device 10 exchanges data with transceiver 16 in the form of information-coded signals in, for example, the gigahertz range. Transmitting/receiving device 10 sends information to transceiver 16 which sends it back to transmitting/receiving device 10 further processing. The incoming response from transceiver 16 is checked for validity in control unit 12. If the received signal agrees with that which is expected, then a function control unit 18, configured as a master-key-system control, is activated in conjunction with bus system 14 along the lines of unlocking the master-key system.

However, in data-exchange operating mode 19, it is not necessary that transmitting/receiving device 10 itself transmit data. It could be sufficient merely to receive the data emitted after actuation of a switching element on transceiver 16. However, security against manipulation is increased when the data exchange is bidirectional. In this embodiment, a propagation-time measurement can be provided as a further validity criterion. If the signal sent by transmitting/receiving device 10 is returned merely by one transceiver 16, this return reply is delayed by filter transient times, times for switchover processes and the transmission time of the signal through space. Were a further transceiver 16 also to participate, unauthorized, in the data exchange, then the use of a further transceiver 16 would imply a further time delay in the reply signal. With the aid of a propagation-time measurement, only one reply delay is permitted which comes about when using a single transceiver 16 within a distance considered as valid. If the reply-signal delay exceeds a specific time threshold, a reply signal—possibly authorized—coming in after that does not initiate an unlocking operation. Since an arrangement for determining propagation time are already provided in radar operating mode 17, it is possible to fall back upon this arrangement to determine propagation time in data-exchange operating mode 19, as well. In addition, the signal sent out in data-exchange operating mode 19 can be used for the energy supply of transceiver 16, so that energy for the subsequent transmission process of transceiver 16 is buffered for a short time.

Transmitting/receiving device 10 can preferably be activated by turns in radar operating mode 17 and in data-exchange operating mode 19, in order to check the plausibility of an unlock demand. In radar operating mode 17, it is determined whether an object is approaching the vehicle. Only in response to an approach is the unlock operation actually initiated. Thus, possibilities for manipulation can be further restricted.

In the exemplary embodiment according to FIG. 3, transmitting/receiving devices 10 are so arranged that they emit signals into the vehicle passenger compartment and receive signals from the vehicle passenger compartment. The two operating modes, radar operation and data exchange, are again provided for this application case, as well. When the vehicle is switched off and locked, transmitting/receiving devices 10 are controlled periodically in radar mode to monitor the passenger compartment. If, from the reflected radar signals, a person is detected in the passenger compartment, then the alarm is activated. On the other hand, in travel operation, the arrangement in radar operating mode 17 determines which vehicle seats are occupied to, if necessary, trigger an airbag only for the occupied seats. A triggering is prevented when the radar signals indicate a child's seat. The switchover from radar mode 17 to data-exchange mode 19 is made when the user steps into the vehicle. To this end, for example, the corresponding opening and closing signals of the door, or a pulling on the door handle can be evaluated. The operation of the ignition switch for starting up the motor vehicle could also effect the change into data-exchange operating mode 19. In data-exchange operating mode 19, a data exchange between transmitting/receiving device 10 and transceiver 16 proceeds in a similar manner as already described for the exemplary embodiment according to FIG. 2. If a signal sent out by transceiver 16 is recognized as valid, control unit 12 generates a suitable enable signal which is routed via bus system 14 to control units 18 which are relevant for the operation. The motor vehicle can thereupon be started, since function control units 18 are now switched so that they are ready for operation.

Clock-pulse generator 24 generates a pulse signal at a frequency of 1 to 50 MHz. First and second pulse generators 26, 27, with the aid of "step recovery diodes" or switching transistors, convert these triggering pulses into short pulses having a duration of less than 1 nanosecond. Adjustable time delay 28, downstream of which is likewise a second pulse generator 27, is used to generate a reference signal. The resulting pulse is accordingly time-delayed compared to the output signal of first pulse generator 26. In radar operating mode 17, first and second switching elements 21, 22 are controlled by control unit 12 along the lines of a closing. Because of this, the pulse is routed directly to the control input of first and second switching elements 31, 32. With the appearance of the pulse, first and second switching elements 31, 32 are closed for this pulse duration. For this time span, the keyed output signal of oscillator 34, e.g. an oscillator in the 2.45 GHz, 5.8 GHz, 24 GHz or 77 GHz range, reaches transmitting antenna 40 via power divider 36. The radar pulse is so short that only a few wave trains of oscillator 34 are transmitted. These wave trains also arrive in a time-delayed manner at the local oscillator input of mixer 38. This signal is correlated with the signal received by receiving antenna 42. The output signal of mixer 38 is evaluated in a signal analysis (not shown) with respect to distance and relative movement.

In data-exchange operating mode 19, first and second switchover arrangements 21, 22 are controlled in accordance with the information to be transmitted or to be received. The information is binary coded, in that first switchover arrangement 21 is opened and closed depending on the bit sequence of the code to be sent. In the open state, the two switchover arrangements 21, 22 apply an output potential (switching signal) to the respective control input of switching elements 31, 32, so that they are controlled along the lines of a closing. In conformity with this binary coding, first switching element 31 routes the output signal of oscillator 34 to transmitting antenna 40. In data-exchange operating mode 19, second switchover arrangement 22 remains open, which arrangement second switching element 32 is controlled along the lines of a closing. The oscillator signal is applied constantly to mixer 38. The input signal acquired by receiving antenna 42, this input signal likewise being binary coded in a corresponding manner, is mixed with the oscillator signal. The output signal of mixer 38 is decoded by a signal acquisition (not shown) and evaluated by comparison with a reference signal for the purpose of checking the authorization.

In data-exchange operating mode 19, second switchover arrangement 22 is controlled by control unit 12 along the lines of an opening, so that the oscillator output signal is applied at the mixer input via second switching element 32 which is then closed. This mixer activation is not suitable for the radar-pulse evaluation. At least second switchover arrangement 22 is influenced as a function of a switching signal of an operating element or monitoring sensor. For example, with the pulling of the door handle, operation of the ignition switch, or after a detected opening or closing of the door, second switchover arrangement 22 is opened, since at this point, an authorization query with corresponding reception of coded information from transceiver 16 is expected in data-exchange operating mode 19.

In an alternative embodiment, the data can also be transmitted with the aid of a frequency modulation or phase modulation. Control unit 12 causes a frequency modulation or phase modulation of oscillator 34 as a function of the information.

A sketch is shown, simplified compared to FIG. 4, when only data-exchange operating mode 19 is necessary. As already described above, the system is used as a receiver. However, if a baseband modulation is applied at port 44 of mixer 38, then this system can also be used as a transmitter. As a supplement to the system according to FIG. 4, the data transmission can be carried out by baseband modulation at port 44 there, as well.

If, for example, transmitting/receiving devices 10 are installed in the door frames, then the direction of beam can be changed from the passenger compartment to the external space by suitable switchover of antennas 40, 42. This could be achieved by "phasing lines", switching over the antennal elements, or by beam forming using two major lobes. A joint transmitting/receiving antenna 40/42 is possible in principle.

Further uses of the circuit arrangement described above can be implemented in data-exchange operating mode 19. To that end, transceiver 16 is arranged in a stationary manner in order, as a function of a signal recognized as valid, to activate a device which frees the entrance to a parking lot, multi-story car park, garage, camping site, car ferries, motorails or the like. The user must actuate an appropriate operating element which initiates the switchover from radar operating mode 17 into the data-exchange operating mode along the lines described above. If is a code recognized as valid is received by stationary transceiver 16, a barrier, a gate or the like is activated in the desired manner.

In addition, the data exchange can be used for debiting fees from an account and/or for access authorization, for example, at parking lots and gas stations.

The relevant diagnostic data stored in the vehicle could likewise be read out in data-exchange operating mode 19 when the vehicle is in the service station for inspection or repair purposes.

Also to be considered as a further application of data-exchange operating mode 19 is the communication with transceivers 16, disposed at the edge of the roadway, for transmitting traffic information.

In a further alternative application in data-exchange operating mode 19, data can be exchanged in a wireless manner with further devices such as a driver information system, a mobile telephone or a computer located in the vehicle. Thus, a warning message generated by the alarm system could be routed automatically via the mobile telephone to a desired mobile telephone terminal connection.

By using various data structures and protocols, the above-indicated applications can be selectively addressed in data-exchange operating mode 19 with the same communication elements.

What is claimed is:

1. A device for ascertaining a distance and transmitting data for a motor vehicle, comprising:
   a transmitting arrangement for generating and emitting a radar signal;
   a receiving arrangement for receiving the radar signal; and
   a switchover arrangement for causing at least one of the transmitting arrangement and the receiving arrangement to operate according to one of:
     a radar operating mode for detecting at least one of the distance and a speed of at least one further object, and
     a data-exchange operating mode for a data exchange with a transceiver, wherein:
       at least one of a drive authorization and an access authorization of the motor vehicle is released in dependence on the data exchange in the data-exchange operating mode.

2. The device according to claim 1, wherein:
the data-exchange operating mode is activated at least one of when the motor vehicle is switched off and when a user has left the motor vehicle.

3. The device according to claim 1, wherein:
the data-exchange operating mode is activated as a function of an actuation of an operating element in conjunction with an initiation of at least one of an unlocking operation and a start operation.

4. The device according to claim 1, wherein:
a specific function is enabled only when a signal detected in the radar operating mode indicates an approaching object.

5. The device according to clam 1, wherein:
the switchover arrangement is activated for coding information to be transmitted in the data-exchange operating mode.

6. The device according to claim 1, further comprising:
an oscillator for providing an oscillator signal;
a transmitting antenna; and
a switching element via which the oscillator signal can be routed to the transmitting antenna, wherein:
   a pulse signal for generating the radar signal is relayed via the switchover arrangement for a control of the switching element.

7. The device according to claim 1, wherein:
the switchover arrangement is controlled as a function of information to be transmitted.

8. The device according to claim 1, wherein:
in the data-exchange operating mode, a signal propagation time, upon which an enablement of a specific motor-vehicle function depends, is determined as a function of a transmitted and a received signal.

9. The device according to claim 1, further comprising:
an oscillator for providing an oscillator signal; and
a mixer, wherein:
   the receiving arrangement includes a receiving antenna that receives the radar signal,
   the mixer correlates the radar signal with the oscillator signal, and
   a specific function is enabled in dependence on an output signal of the mixer.

10. The device according to claim 9, further comprising:
another switchover arrangement, wherein:
   the oscillator signal is applied at an input of the mixer as a function of the other switchover arrangement.

11. The device according to claim 9, wherein:
the oscillator signal is applied at an input of the mixer in the data-exchange operating mode.

12. The device according to claim 1, wherein:
an actuator of a smart master-key system is controlled as a function of the data exchange in the data-exchange operating mode.

* * * * *